(12) United States Patent
Hoffman, Jr. et al.

(10) Patent No.: US 11,932,970 B2
(45) Date of Patent: Mar. 19, 2024

(54) ELECTROSPUN NANOFIBERS

(71) Applicant: The Johns Hopkins University, Baltimore, MD (US)

(72) Inventors: Christopher M. Hoffman, Jr., Odenton, MD (US); Matthew P. Yeager, Huntsville, AL (US); Morgana M. Trexler, Baltimore, MD (US); Zhiyong Xia, Rockville, MD (US); Douglas A. Smith, Washington, DC (US); Marcia W. Patchan, Columbia, MD (US)

(*) Notice: Subject to any disclaimer, the term of this patent is extended or adjusted under 35 U.S.C. 154(b) by 825 days.

(21) Appl. No.: 16/553,232

(22) Filed: Aug. 28, 2019

(65) Prior Publication Data
US 2020/0224335 A1 Jul. 16, 2020

Related U.S. Application Data

(60) Provisional application No. 62/792,989, filed on Jan. 16, 2019.

(51) Int. Cl.
*D01F 6/60* (2006.01)
*D04H 1/728* (2012.01)

(52) U.S. Cl.
CPC ............. *D01F 6/605* (2013.01); *D04H 1/728* (2013.01); *D10B 2331/021* (2013.01)

(58) Field of Classification Search
CPC .. D01F 6/605; D04H 1/728; D10B 2331/021; D01D 5/003
See application file for complete search history.

(56) References Cited

U.S. PATENT DOCUMENTS

| | | | |
|---|---|---|---|
| 4,845,162 A | 7/1989 | Schmitt et al. | |
| 4,894,422 A | 1/1990 | Peiffer et al. | |
| 2014/0162063 A1 | 6/2014 | Dzenis | |
| 2015/0099185 A1 | 4/2015 | Joo et al. | |
| 2016/0113340 A1* | 4/2016 | Levit | B32B 27/34 2/455 |
| 2017/0342599 A1 | 11/2017 | Yeager et al. | |

FOREIGN PATENT DOCUMENTS

| | | | |
|---|---|---|---|
| GB | 2427382 | 12/2006 | |
| KR | 2014026695 A | * 3/2014 | ............. A41D 31/24 |

OTHER PUBLICATIONS

Yao, Jian et al, "Electrospinning of p-Aramid Fibers", 2015, Macromol. Mater. Eng. 12, pp. 1238-1245. (Year: 2015).*

Garcia, Jose M. et al, "Constitutional Isomerism in Polyamides Derived From Isophthaloyl Chloride and 1,3-Diamine-4-chlorobenzene", 2003, Journal of Polymer Science: Part A: Polymer Chemistry, vol. 41, pp. 1202-1215. (Year: 2003).*

(Continued)

*Primary Examiner* — Peter Y Choi

(74) *Attorney, Agent, or Firm* — Todd R. Farnsworth

(57) ABSTRACT

A nanofiber comprising a polyamide including at least one substituted phenyl group is provided. The nanofiber includes an average diameter from about 50 to about 1000 nm. A fibrous mat including a plurality of the nanofibers is also provided. A composite including a plurality of the nanofibers and a continuous matrix resin is also provided. A method of forming the nanofibers is also provided.

13 Claims, 12 Drawing Sheets

(56) References Cited

OTHER PUBLICATIONS

Ruiz, Jose A. Reglero et al, "Functional Aromatic Polyamides", 2017, Polymers, vol. 9, 414, pp. 1-44. (Year: 2017).*
Kapuscinska, M et al, "Aromatic Polyamides. XI. Effect of the Halogen Substitution on the Thermal and Flammability Behavior of Poly(I,4-Phenylene Terephthalamide)," 1984, Journal of Polymer Science: Polymer Chemistry Edition, vol. 22, pp. 3989-3998. (Year: 1984).*
Machine translation for KR 2014-0026695 to Park. (Year: 2014).*
Kiyotsukuri, Tsuyoshi et. al., "Synthesis and Properties of Aramids and Polyarylates Having Perfluoro-Substituents on the Benzene Ring," 1988, Journal of Polymer Science: Part A: Polymer Chemistry, vol. 26, pp. 2225-2234. (Year: 1988).*
Nagata, M., et. al., "Synthesis and properties of polyamides derived from systematically halogenated terephthalic acids with fluorine, chlorine, or bromine atoms", J. Polym. Sci. A Polym. Chem., 26: 235-245, available at https://doi.org/10.1002/pola.1988.080260123 (Year: 1988).*
Curgul, S. et al., Molecular dynamics simulation of size-dependent structural and thermal properties of polymer nanofibers, Macromolecules 2007, 40, 8483-8489.
Deitzel, J. M. et al., The effect of processing variables on the morphology of electrospun nanofibers and textiles, Polymer 2001, 42(1), 261-272.
Li, D. et al., Electrospinning of Nanofibers: Reinventing the Wheel?, Adv. Mater. 2004, 16, 1151.
Gibson, P. W. et al., Electrospun fiber mats: Transport properties, 1999, 45, 190-195.
Kim, J. S. et al., Mechanical properties of composites using ultrafine electrospun fibers, Polym. Compos. 1999, 20, 124-131.
Hogg, P. J., Composites in armor, Science 2006, 314, 1100-1101.
Jassal, M. et al., Aramid fibres—An overview, Indian J. Fibre Text. 2002, 27, 290-306.
Takayanagi, M. et al., A New Chemical Method of Surface-Treatment of Kevlar Fiber for Composites with Epoxy Resin, Polym. J. 1987, 19, 467-474.
Takayanagi, M. et al., Syntheses and characterization of N-grafted poly (p-phenylene terephthalamide), J. Polym. Sci. 1983, 21, 31.
Takayanagi, M. et al., Surface-Modified Kevlar Fiber-Reinforced Polyethylene and Ionomer, J. Appl. Polym. Sci., 1982, 27, 3903.
Takayanagi, M., et al., N-Substituted Poly(p-Phenylene Terephthalamide), J. Polym. Sci. 1981, 19, 1133.
Ai, T. et al., Effect of grafting alkoxysilane on the surface properties of Kevlar fiber, Polym. Compos., 2007, 28, 412-416.
Small, Some Factors Affecting the Solubility of Polymers, J. Appl. Chem., 1953, 3, 71-80.
Koenhen et al., The Determination of Solubility Parameters of Solvents and Polymers by Means of Correlations with Other Physical Quantities, J. Appl. Polymer Science, 1975, 19, 1163-1179.
Aharoni, The Solubility Parameters of Aromatic Polyamides, J. Appl. Polymer Science, 1992, 45, 813-817.
Ahmed et al., Microstructural Developments of Poly (p-phenylene terephthalamide) Fibers During Heat Treatment Process: A Review, Materials Research, 2014, 17(5), 1180-1200.
Hoogsteen et al., SAXS experiments on voids in gel-spun polyethylene fibres, 1990, 25, 1551-1556.
Ran et al., Structural changes during deformation of Kevlar fibers via on-line synchrotron SAXS/WAXD techniques, Polymer, 2001, 42, 1601-1612.
Panar et al., Morphology of Poly( p-Phenylene Terephthalamide) Fibers, Journal of Polymer Science: Polymer Physics Edition, 1983, 21, 1955-1969.
Morgan et al., The Relationship between the Physical Structure and the Microscopic Deformation and Failure Processes of Poly (p-Phenylene Terephthalamide) Fibers, Journal of Polymer Science: Polymer Physics Edition, 1983, 21, 1757-1783.
Dobb et al., Role of microvoids in aramid fibres, Journal of Materials Science, 1992, 27, 3876-3878.
Dobb et al., Structural characteristics of aramid fibre variants, Journal of Materials Science, 1990, 25, 459-464.
Papkov, D., Y. Zou, M.N. Andalib, A. Goponenko, S.Z.D. Cheng, and Y.A. Dzenis, Simultaneously Strong and Tough Ultrafine Continuous Nanofibers, ACS Nano, 2013. 7(4): p. 3324-3331.
Tanner, D., J.A. Fitzgerald, and B.R. Phillips, The Kevlar Story-an Advanced Materials Case Study, Angewandte Chemie International Edition in English, 1989. 28(5): p. 649-654.
Vaseashta, A., Controlled formation of multiple Taylor cones in electrospinning process, Applied Physics Letters, 2007. 90(9): p. 093115.
Ondarcuhu, T. and C. Joachim, Drawing a single nanofibre over hundreds of microns, EPL (Europhysics Letters), 1998. 42(2): p. 215.
Yang, M., K. Cao, L. Sui, Y. Qi, J. Zhu, A. Waas, E.M. Arruda, J. Kieffer, M.D. Thouless, and N.A. Kotov, Dispersions of Aramid Nanofibers: A New Nanoscale Building Block, ACS Nano, 2011. 5(9): p. 6945-6954.
Huang, Z.-M., Y.Z. Zhang, M. Kotaki, and S. Ramakrishna, A review on polymer nanofibers by electrospinning and their applications in nanocomposites, Composites Science and Technology, 2003. 63(15): p. 2223-2253.
Subbiah, T., G.S. Bhat, R.W. Tock, S. Parameswaran, and S.S. Ramkumar, Electrospinning of nanofibers, Journal of Applied Polymer Science, 2005. 96(2): p. 557-569.
Srinivasan, G. and D.H. Reneker, Structure and morphology of small diameter electrospun aramid fibers, Polymer International, 1995. 36(2): p. 195-201.
Gonzalez, G.M., L.A. MacQueen, J.U. Lind, S.A. Fitzgibbons, C.O. Chantre, I. Huggler, H.M. Golecki, J.A. Goss, and K.K. Parker, Production of Synthetic, Para-Aramid and Biopolymer Nanofibers by Immersion Rotary Jet-Spinning, Macromolecular Materials and Engineering, 2017. 302(1): p. 1600365.
Cao, K., C.P. Siepermann, M. Yang, A.M. Waas, N.A. Kotov, M.D. Thouless, and E.M. Arruda, Reactive Aramid Nanostructures as High-Performance Polymeric Building Blocks for Advanced Composites, Advanced Functional Materials, 2013. 23(16): p. 2072-2080.
Lu, Z., L. Si, W. Dang, and Y. Zhao, Transparent and mechanically robust poly (para-phenylene terephthamide) PPTA nanopaper toward electrical insulation based on nanoscale fibrillated aramid-fibers, Composites Part A: Applied Science and Manufacturing, 2018. 115: p. 321-330.
Yeager, M.P., C.M. Hoffman, Z. Xia, and M.M. Trexler, Method for the synthesis of para-aramid nanofibers, Journal of Applied Polymer Science, 2016. 133(42).
Tian, W., T. Qiu, Y. Shi, L. He, and X. Tuo, The facile preparation of aramid insulation paper from the bottom-up nanofiber synthesis, Materials Letters, 2017. 202: p. 158-161.
Dewilde, S., W. Dehaen, and K. Binnemans, Ionic liquids as solvents for PPTA oligomers, Green Chemistry, 2016. 18(6): p. 1639-1652.
Bair, T.I., P.W. Morgan, and F.L. Killian, Poly( 1,4-phenyleneterephthalarnides) Polymerization and Novel Liquid-Crystalline Solutions, Macromolecules, 1977. 10(6): p. 1396-1400.
Fonck, E., G.G. Feigl, J. Fasel, D. Sage, M. Unser, D.A. Rufenacht, and N. Stergiopulos, Stroke, 2009. 40: p. 2552-2556.
Calderon-Colon, X., Z. Xia, J.L. Breidenich, D.G. Mulreany, Q. Guo, O.M. Uy, J.E. Tiffany, D.E. Freund, R.L. McCally, O.D. Schein, J.H. Elisseeff, and M.M. Trexler, Structure and properties of collagen vitrigel membranes for ocular repair and regeneration applications, Biomaterials, 2012. 33(33): p. 8286-95.
Tarus, B., N. Fadel, A. Al-Oufy, and M. El-Messiry, Effect of polymer concentration on the morphology and mechanical characteristics of electrospun cellulose acetate and poly (vinyl chloride) nanofiber mats, Alexandria Engineering Journal, 2016. 55(3): p. 2975-2984.
McCormick, C.L., P.A. Callais, and B.H. Hutchinson, Solution studies of cellulose in lithium chloride and N,N-dimethylacetamide, Macromolecules, 1985. 18(12): p. 2394-2401.
Qin, M., H. Kong, K. Zhang, C. Teng, M. Yu, and Y. Liao, Simple Synthesis of Hydroxyl and Ethylene Functionalized Aromatic

(56) References Cited

OTHER PUBLICATIONS

Polyamides as Sizing Agents to Improve Adhesion Properties of Aramid Fiber/Vinyl Epoxy Composites, Polymers, 2017. 9(4): p. 143.

Bauer, F., S. Denneler, and M. Willert-Porada, Influence of temperature and humidity on the mechanical properties of Nafion® 117 polymer electrolyte membrane, Journal of Polymer Science Part B: Polymer Physics, 2005. 43(7): p. 786-795.

Lefebvre, D.R., P.R. Elliker, K.M. Takahashi, V.R. Raju, and M.L. Kaplan, The critical humidity effect in the adhesion of epoxy to glass: role of hydrogen bonding, Journal of Adhesion Science and Technology, 2000. 14(7): p. 925-937.

Murthy, N.S., Hydrogen bonding, mobility, and structural transitions in aliphatic polyamides, Journal of Polymer Science Part B: Polymer Physics, 2006. 44(13): p. 1763-1782.

Noether, H.D., Factors affecting the formation of hard elastic fibers, Polymer Engineering & Science, 1979. 19(6): p. 427-432.

Schroeder, L.R. and S.L. Cooper, Hydrogen bonding in polyamides, Journal of Applied Physics, 1976. 47(10): p. 4310-4317.

Zhous, Y. and G.Z. Tan, Fabrication of nanofiber mats with microstructure gradient by cone electrospinning, Nanomaterials and Nanotechnology, 2017. 7: p. 1-8.

Fee, T., S. Surianarayanan, C. Downs, Y. Zhou, and J. Berry, Nanofiber Alignment Regulates NIH3T3 Cell Orientation and Cytoskeletal Gene Expression on Electrospun PCL+Gelatin Nanofibers, PLOS One, 2016. 11(5): p. e0154806.

Baji, A., Y.-W. Mai, S.-C. Wong, M. Abtahi, and P. Chen, Electrospinning of polymer nanofibers: Effects on oriented morphology, structures and tensile properties, Composites Science and Technology, 2010. 70(5): p. 703-718.

Huang, C., S. Chen, D.H. Reneker, C. Lai, and H. Hou, High-strength mats from electrospun poly(p-phenylene biphenyltetracarboximide) nanofibers, Advanced Materials, 2006. 18(5): p. 668-671.

Maciel, M.M., S. Ribeiro, C. Ribeiro, A. Francesko, A. Maceiras, J.L. Vilas, and S. Lanceros-Méndez, Relation between fiber orientation and mechanical properties of nano-engineered poly(vinylidene fluoride) electrospun composite fiber mats, Composites Part B: Engineering, 2018. 139: p. 146-154.

Pauly, H.M., D.J. Kelly, K.C. Popat, N.A. Trujillo, N.J. Dunne, H.O. Mccarthy, and T.L. Haut Donahue, Mechanical properties and cellular response of novel electrospun nanofibers for ligament tissue engineering: Effects of orientation and geometry, J Mech Behav Biomed Mater, 2016. 61: p. 258-270.

Naraghi, M., I. Chasiotis, H. Kahn, Y. Wen, and Y. Dzenis, Novel method for mechanical characterization of polymeric nanofibers, Review of Scientific Instruments, 2007. 78(8): p. 085108.

Bazbouz, M.B. and G.K. Stylios, The tensile properties of electrospun nylon 6 single nanofibers, Journal of Polymer Science Part B: Polymer Physics, 2010. 48(15): p. 1719-1731.

Naraghi, M., S.N. Arshad, and I. Chasiotis, Molecular orientation and mechanical property size effects in electrospun polyacrylonitrile nanofibers, Polymer, 2011. 52(7): p. 1612-1618.

Fei, C., P. Xinwen, L. Tingting, C. Shuiliang, W. Xiang-Fa, H.R. Darrell, and H. Haoqing, Mechanical characterization of single high-strength electrospun polyimide nanofibres, Journal of Physics D: Applied Physics, 2008. 41(2): p. 025308.

Li, L., L.M. Bellan, H.G. Craighead, and M.W. Frey, Formation and properties of nylon-6 and nylon-6/montmorillonite composite nanofibers, Polymer, 2006. 47(17): p. 6208-6217.

Lim, C., E. Tan, and S. Ng, Effects of crystalline morphology on the tensile properties of electrospun polymer nanofibers, Applied Physics Letters, 2008. 92(14): p. 141908.

Cheng, M., W. Chen, and T. Weerasooriya, Mechanical Properties of Kevlar® KM2 Single Fiber, Journal of Engineering Materials and Technology, 2005. 127: p. 97.

Kevlar Aramid Fiber Technical Guide, Dupont, Editor. 2017.

Heo, S.J., N.L. Nerurkar, B.M. Baker, J.W. Shin, D.M. Elliott, and R.L. Mauck, Fiber stretch and reorientation modulates mesenchymal stem cell morphology and fibrous gene expression on oriented nanofibrous microenvironments, Annals of Biomedical Engineering, 2011. 39(11): p. 2780-2790.

* cited by examiner

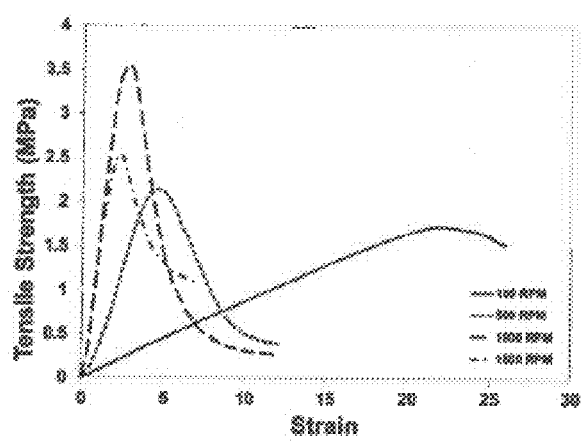
FIG. 8A
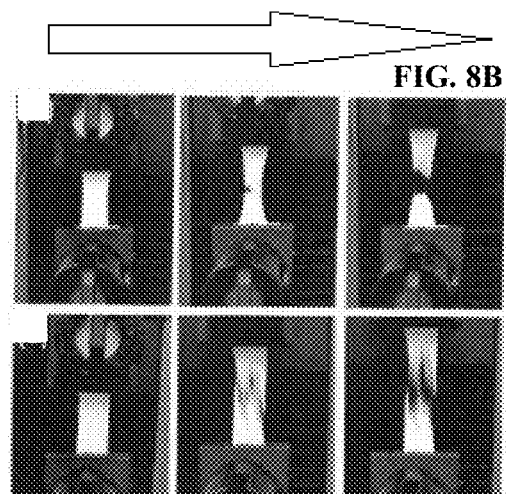
FIG. 8B
FIG. 8C

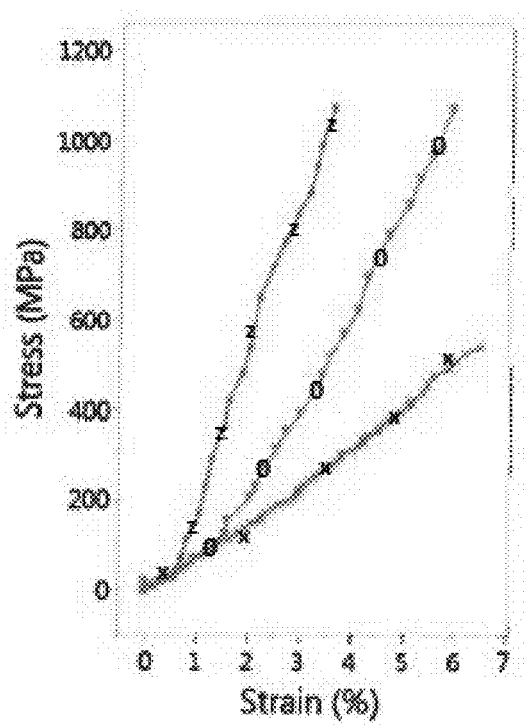
FIG. 10A
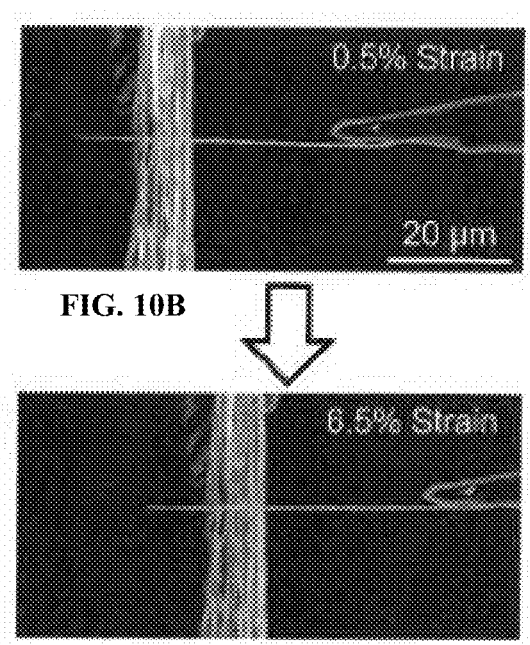
FIG. 10B
FIG. 10C

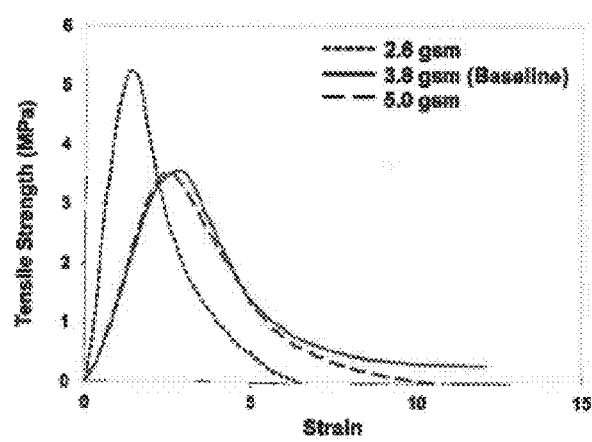
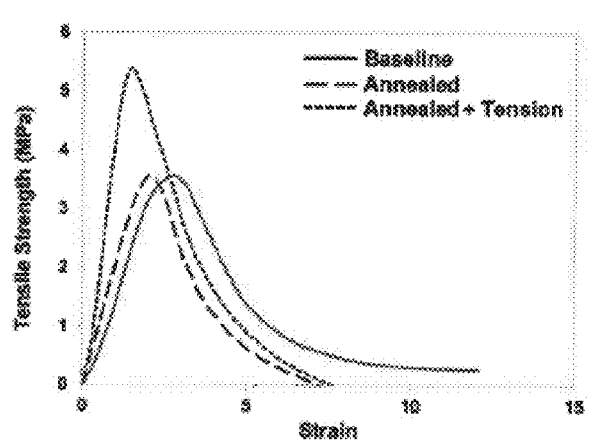
FIG. 11A                    FIG. 11B

ELECTROSPUN NANOFIBERS

CROSS-REFERENCE TO RELATED APPLICATIONS

This application claims the benefit of U.S. Provisional Application No. 62/792,989, filed on Jan. 16, 2019, which is expressly incorporated by reference herein in its entirety.

TECHNICAL FIELD

Embodiments of the presently-disclosed invention relate generally to nanofibers comprising a polyamide including at least one substituted phenyl group and fibrous mats including the same. Embodiments of the presently-disclosed invention also relate generally to composites including a plurality of the polyamide nanofibers as well as methods of making polyamides.

BACKGROUND

It is well known that nanofibers exhibit improved mechanical properties compared to microfibers of the same materials due to fewer defects being present within the smaller volume. For example, tensile strength, modulus and toughness of polyacrylonitrile (PAN) electrospun fibers have been demonstrated to increase dramatically when the fiber diameter decreased to nanoscale. While impressive improvement in properties was realized as a function of fiber diameter, the properties of PAN do not compare to those of high performance fibers like Kevlar®. Kevlar® (poly(para-phenylene terephthalamide), PPTA) fibers demonstrate superior mechanical properties due to enhanced inter-chain cohesion through extensive hydrogen bonding interactions, making it ideal for several applications. If PPTA or other higher performance fibers could be fabricated in large quantities at the nanoscale, there is significant potential for unprecedented fiber mechanical properties. However, synthesis of PPTA microfibers relies upon harsh solvents and does not lend itself to fabrication of nanoscale fibers. Moreover, to produce PPTA nanofibers in large scale batches using organic solvents, solubility must be enhanced, ideally without significantly disrupting inter-chain hydrogen bonding and the resulting mechanical properties.

SUMMARY OF INVENTION

Certain embodiments according to the invention provide a nanofiber comprising a polyamide including at least one halogen-substituted phenyl group. In accordance with certain embodiments of the invention, the nanofiber may have an average diameter from about 50 to about 1000 nm.

In another aspect, embodiments of the present invention provide a fibrous mat comprising a plurality of nanofibers. In accordance with certain embodiments of the invention, the plurality of nanofibers may comprise a polyamide, for example, including at least one substituted phenyl group. In accordance with certain embodiments of the invention, the plurality of nanofibers may have an average diameter from about 50 to about 1000 nm.

In another aspect, embodiments of the present invention provide a composite including a plurality of nanofibers comprising a polyamide including at least one halogen-substituted phenyl group, in which the plurality of nanofibers may have an average diameter from about 50 to about 1000 nm. In accordance with certain embodiments of the invention, the composite may also include a continuous matrix resin, in which the plurality of nanofibers is at least partially embedded within the continuous matrix resin.

In another aspect, embodiments of the present invention provide a method of forming a nanofiber. The method may comprise forming or providing a polyamide including at least one halogen-substituted phenyl group. In accordance with certain embodiments of the invention, the method may also comprise dissolving a salt and the polyamide in an organic solvent to form a polymer solution, in which the polymer solution comprises from about 3% to about 30% by weight of the polyamide and from about 1% to about 10% by weight of the salt. In accordance with certain embodiments of the invention, the method may comprise forming a supernatant layer and an anisotropic phase layer from the polymer solution, such as be centrifuging the polymer solution. In accordance with certain embodiments of the invention, the method may also include separating the anisotropic phase layer from the supernatant layer. In accordance with certain embodiments of the invention, the method may also include (v) electrospinning the anisotropic phase to form the nanofiber.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIG. 8A illustrates examples of the stress-strain behavior exhibited by nanofiber mats;

FIG. 8B illustrates a series of photographs during tensile testing of a 100 RPM mat;

FIG. 8C illustrates a series of photographs during tensile testing of a 1500 RPM mat;

FIG. 10A shows three example tensile stress-strain curves;

FIGS. 10B and 10C show SEM images from the beginning and end of the tensile test corresponding to that plotted with 'x' symbols in FIG. 10A, respectively; and FIGS. 11A-11B show example stress-strain curves in accordance with certain embodiments of the invention.

DETAILED DESCRIPTION

Figure 1:
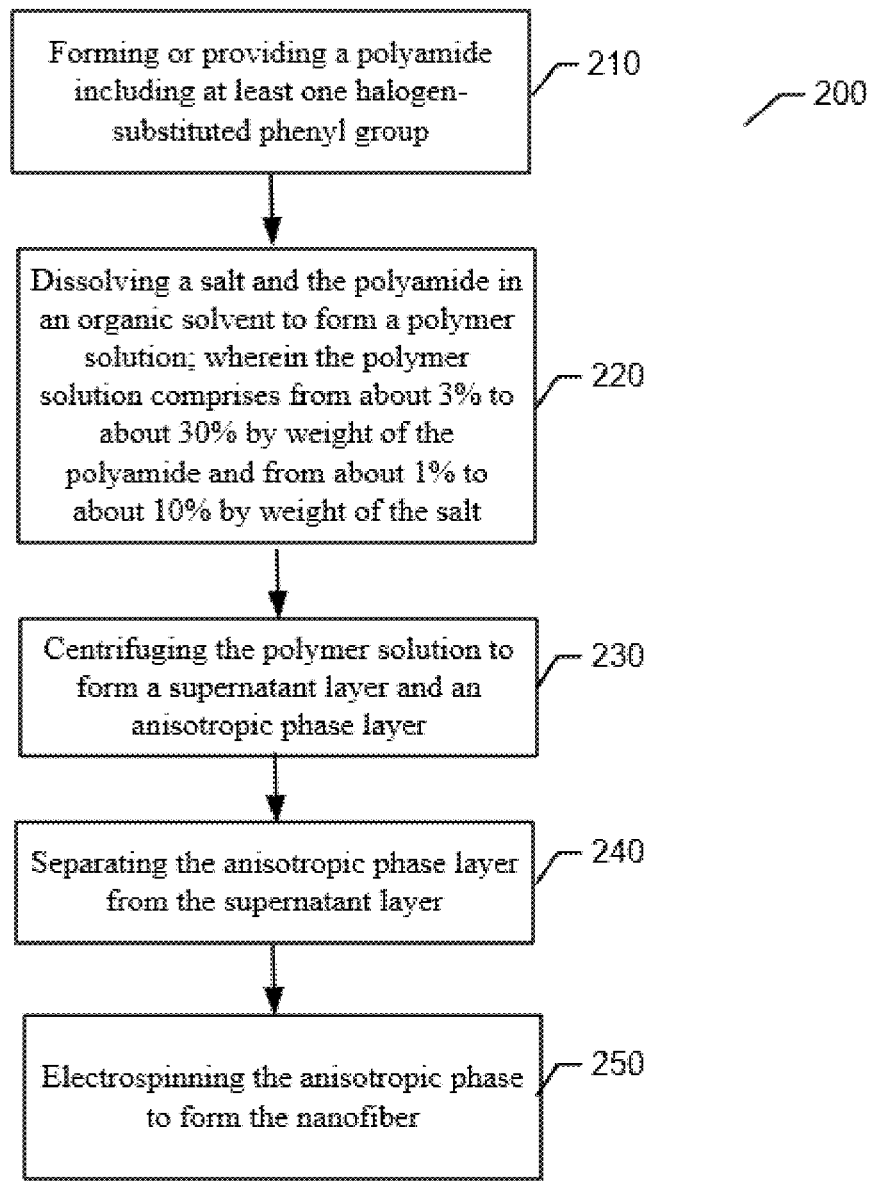
FIG. 1 illustrates a flow diagram for a method 200 of forming a nanofiber in accordance with certain embodiments of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

U.S. application Ser. No. 15/468,411, filed Mar. 24, 2017, is hereby incorporated by reference in its entirety.

The presently-disclosed invention relates generally to nanofibers comprising a polyamide (e.g., a para-aramid) including at least one substituted phenyl group (e.g., a halogen-substituted phenyl group). In accordance with certain embodiments of the invention, the substitution on the phenyl group or groups increases the solubility of the polyamide in an organic solvent as compared to an identical polyamide being devoid of such substituted phenyl group. In accordance with certain embodiments of the invention, the polyamide including at least one substituted phenyl group forms an anisotropic solution (e.g., a liquid-crystalline aramid) that may be electrospun to form the polyamide nanofibers. For example, the polyamide nanofibers may have an average diameter from about 50 to about 1000 nm. The polyamide nanofibers may be provided in the form of a fibrous mat and/or incorporated within a polymeric composite.

In accordance with certain embodiments of the invention, the disclosed nanofibers may comprise a polyamide including at least one substituted phenyl group, wherein the nanofiber has an average diameter from about 50 to about 1000 nm. The at least one substituted phenyl group, for example, may include one or more chemical substitutions that at least partially disrupt the degree of hydrogen bonding associated with, for example, para-aramids such as PPTA. In this regard, the one or more substitutions on the one or more phenyl groups of the polyamide at least partially reduces the extent of hydrogen bonding associated between two such polyamides. In accordance with certain embodiments of the invention, the at least one substituted phenyl group of the polyamides disclosed herein may vary along the backbone of the polyamide to tailor the solubility of the polyamide in a desired organic solvent to ultimately form an anisotropic solution (e.g., a liquid-crystalline aramid) that may be electrospun to form the polyamide nanofibers disclosed herein. For example, the frequency of the number of substituted phenyl groups, the number of substitutions on a given phenyl group, and the chemical nature of the individual substitutions may be varied as desired (e.g., for imparting solubility in a desired organic solvent and/or to facilitate formation of an anisotropic solution of the polyamide).

In accordance with certain embodiments of the invention, the nanofiber may have an average diameter from about 50 to about 1000 nm, such as at most about any of the following: 1000, 950, 900, 850, 800, 750, 700, 650, 600, 550, 500, 450, 400, and 300 nm and/or at least about any of the following: 50, 75, 100, 125, 150, 175, 200, 225, 250, 275, 300, 325, and 350 nm.

In accordance with certain embodiments of the invention, the nanofiber may comprise a polyamide including at least one halogen-substituted phenyl group, in which the nanofiber has an average diameter from about 50 to about 1000 nm. In accordance with certain embodiments of the invention, the polyamide comprises a para-aramid. For example, the polyamide may comprise the reaction of at least a Monomer A and a Monomer B that defines a first repeating unit, wherein the polyamide comprises a plurality of first repeating units, and wherein the first repeating unit comprises a structure according to Formula (1):

Formula (1)

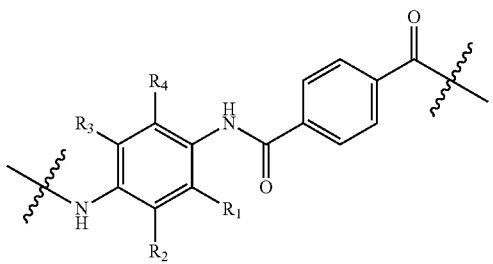

In Formula (1), for example, $R_1$, $R_2$, $R_3$, and $R_4$ are each independently selected from H, a halogen, a saturated aliphatic radical having from 1 to 30 carbon atoms, an unsaturated aliphatic radical having from 1 to 30 carbon atoms, a nitro group, a carboxylic acid radical, or an ether radical; with the proviso that at least one of $R_1$, $R_2$, $R_3$, and $R_4$ is a halogen. Although not shown in Formula (1) above, the un-substituted phenyl group in Formula (1) may alternatively or also be substituted in a similar fashion as $R_1$, $R_2$, $R_3$, and $R_4$. In accordance with certain embodiments of the invention, $R_1$ is a halogen, $R_2$, $R_3$, and $R_4$ are each H. For example, $R_1$ may comprise chlorine, fluorine, or bromine. In accordance with certain embodiments of the invention, the polyamide may consist of the plurality of first repeating units, in which $R_1$ is a halogen, and $R_2$, $R_3$, and $R_4$ are each H.

In accordance with certain embodiments of the invention, the polyamide may comprise at least one repeating unit according to Formula (1) in combination with a Monomer C, in which Monomer C is 1,4-phenylene-diamine. In this regard, for example, the polyamide may include a monomer component comprising 1,4-phenylene-diamine. In accordance with certain embodiments of the invention, at least about 10% of the phenyl groups of the polyamide include at least one substitution, such as at least about any of the following: 10, 15, 20, 25, 30, 40, 45, 50, 55, 60, 70, 75, and 80% of the phenyl groups of the polyamide include at least one substitution and/or at most about any of the following: 100, 95, 90, 85, 80, 75, 70, 65, 60, 55, and 50% of the phenyl groups of the polyamide include at least one substitution. In accordance with certain embodiments of the invention, for example, $R_1$, and $R_2$ of Formula (1) may comprise a substitution as noted above (e.g., each may comprise a halogen on the same phenyl group), and the polyamide comprises a larger amount of 1,4-phenylene-diamine than the $R_1$, and $R_2$-substituted phenyl component. For example, a ratio between the 1,4-phenylene-diamine than the $R_1$ and $R_2$-substituted phenyl component may comprise more than 1.2:1, such as at least about 1.25:1, at least about 1.3:1, at least about 1.5:1, at least about 1.75:1, at least about 2:1, at least about 2.5:1, at least about 3:1, at least about 4:1, at least about 5:1, at least about 6:1, at least about 7:1, at least about 8:1, or at least about 9:1. In accordance with certain embodiments of the invention, for example, the more substitutions on an individual phenyl group may enable substitution of fewer individual phenyl groups of the polyamide to achieve a desired solubility level (e.g., for imparting solubility in a desired organic solvent and/or to facilitate formation of an anisotropic solution of the polyamide).

In accordance with certain embodiments of the invention, the polyamide may comprise the reaction product of (i) Monomer A, (ii) Monomer B, and optionally (iii) Monomer C, in which Monomer A is selected from one or more of the compounds according to Formula (2), Monomer B is selected from one or more of the compounds according to Formula (3), and Monomer C is selected from one or more of the compounds according to Formula (4):

Formula (2)

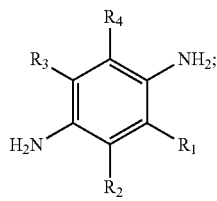

L

Formula (3)

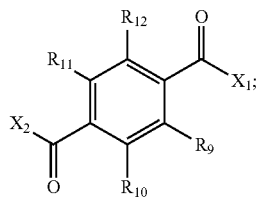

M

Formula (4)

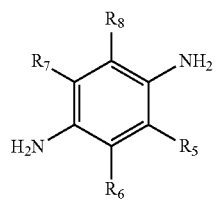

N wherein $R_1$, $R_2$, $R_3$, $R_4$, $R_5$, $R_6$, $R_7$, $R_8$, $R_9$, $R_{10}$, $R_{11}$, and $R_{12}$ are each independently selected from H, a halogen, a saturated aliphatic radical having from 1 to 30 carbon atoms, an unsaturated aliphatic radical having from 1 to 30 carbon atoms, a nitro group, a carboxylic acid radical, or an ether radical;

wherein $X_1$ and $X_2$ are each independently selected from a halogen;

wherein coefficient L is the relative number of moles for Monomer A with respect to a total number of moles for Monomers A through C, coefficient M is the relative number of moles of Monomer B with respect to the total number of moles for Monomers A through C, and coefficient N is the relative number of moles of Monomer C with respect to the total number of moles for Monomers A through C; and wherein L+N=M, and L+M+N=1.

In accordance with certain embodiments of the invention, L and N are each not zero and a ratio between L and N may comprise more than 4:1, or at least about 3:1, or at least about 2.5:1, or at least about 1.2:1, or at least about 3:2, or at least about 1:1.

In accordance with certain embodiments of the invention, $R_1$ and $R_2$ each are not hydrogen. For example, each of $R_1$ and $R_2$ may comprise a halogen, an alkyl group, or a nitro group. In accordance with certain embodiments of the invention N and L are not zero, and N is greater than L. In accordance with certain embodiments of the invention, a ratio between N and L may comprise more than 1.2:1, such as at least about 1.25:1, at least about 1.3:1, at least about 1.5:1, at least about 1.75:1, at least about 2:1, at least about 2.5:1, at least about 3:1, at least about 4:1, at least about 5:1, at least about 6:1, at least about 7:1, at least about 8:1, or at least about 9:1.

In accordance with certain embodiments of the invention, the polyamide comprises a melt or anisotropic solution (e.g., a liquid-crystalline aramid) having an intrinsic viscosity or least about 200 mPa*s, such as at least about any of the following: 200, 300, 400, 500, 600, 700, 800, 900, 1000, 1100, and 1200 mPa*s and/or at least about any of the following: 2000, 1900, 1800, 1700, 1600, 1500, 1400, 1300, 1200, 1100, and 1000 mPa*s. In accordance with certain embodiments of the invention, an average chain length of the polyamide may be evaluated by the intrinsic viscosity, in which a larger intrinsic viscosity being representative of a larger average chain length for the polyamide.

In accordance with certain embodiments of the invention, the nanofibers may comprise continuous fibers, staple fibers, or a combination thereof. In this regard, a continuous fiber as used herein may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

In accordance with certain embodiments of the invention, the nanofibers may comprise a tensile strength about 1 GPa to about 400 GPa, such as at least about any of the following: 1, 1.5, 2, 2.5, 3, 3.5, 5, 5, 6, 8, 10, 25, 50, 75, 100 and 150 GPa and/or at most about any of the following: 400, 350, 300, 250, 200, 150, and 100 GPa. In accordance with certain embodiments of the invention, the nanofibers may comprise an elastic modulus of about 10 GPa to about 100 GPa, such as at least about any of the following: 10, 12, 14, 16, 18, 20, 22, 24, 26, 28, 30, 32, 34, 36, 38, 40, 45, and 50 and/or at most about any of the following: 120, 110, 100, 95, 90, 85, 80, 75, 70, 65, 60, 55, and 50 GPa.

In another aspect, embodiments of the present invention provide a fibrous mat comprising a plurality of nanofibers. In accordance with certain embodiments of the invention, the plurality of nanofibers may comprise a polyamide (e.g., a para-aramid) including at least one substituted phenyl group (e.g., a halogen-substituted phenyl group) as described and disclosed herein. In accordance with certain embodiments of the invention, the plurality of nanofibers may have an average diameter from about 50 to about 1000 nm. By way of example only, the plurality of nanofibers may comprise a polyamide including at least one halogen-substituted phenyl group. In this regard, the fibrous mat, in accordance with certain embodiments of the invention, may comprise a plurality of nanofibers comprising one or more polyamides as described and disclosed herein. For example, the plurality of nanofibers may comprise a first group of nanofibers comprising a first polyamide as described and disclosed herein and a second group of nanofibers comprising a second polyamide as described and disclosed herein. In this regard, for example, a fibrous mat may include nanofibers all formed from the same polyamide or a blend of different groups of nanofibers formed from different polyamides as described and disclosed herein. In accordance with certain embodiments of the invention, the first group of nanofibers formed from a first polyamide as described and disclosed herein may impart a desired tensile strength to the fibrous mat while the presence of the second group of fibers may impart a desired Young's Modulus such that the fibrous mat simultaneously provides a desired tensile strength due to the first group of nanofibers and a desired Young's Modulus due to the second group of nanofibers.

In accordance with certain embodiments of the invention, the plurality of nanofibers may comprise continuous fibers, staple fibers, or a combination thereof. In this regard, a continuous fiber as used herein may comprise a fiber in which the length of the fiber is at least 1,000 times larger than the average diameter of the fiber, such as the length of the fiber being at least about 5,000, 10,000, 50,000, or 100,000 times larger than the average diameter of the fiber. In accordance with certain embodiments of the invention, the fibrous mat may comprise additional fibers intermixed or blended with the plurality of nanofibers comprising a polyamide as described and disclosed herein. For example, the additional fibers may comprise non-polyamide fibers and may comprise a variety of average diameters (e.g., nanofibers and larger than nanofibers, such as greater than 1 micron, greater and 10 microns, etc.)

In accordance with certain embodiments of the invention, the fibrous mat has an areal density from at least about to 1 gram-per-square-meter (gsm) to about 50 gsm, such as at least about any of the following: 1, 2, 3, 5, 10, 15, 20, 25, and 30 gsm and/or at most about any of the following: 50, 45, 40, 35, 30, 25, and 20 gsm.

In accordance with certain embodiments of the invention, a plurality of fibrous mats may be laid-up in a variety of different configurations (e.g., lay-up orientations). For example, a plurality of individual fibrous mats may be subjected to a variety of lay-up orientations relative to each other (e.g., parallel-laid, orthogonally-laid, etc.). Each of the fibrous mats may be independently laid relative to adjacent fibrous mats. By way of example only, certain embodiments of the invention may comprise a first fibrous mat being aligned in a first direction laid directly or indirectly onto or over a second fibrous mat being aligned in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction). For example, a [0/90] lay-up orientation references a first fibrous mat aligned in a direction considered to be at 0° (as a point of reference) and a second fibrous mat laid on top or over the first fibrous mat, in which the second fibrous mat is aligned in a direction 90° relative to the alignment of the first fibrous mat. In accordance with certain embodiments, the laid-up fibrous mats may define a fiber batt. The formed batt may be fixed, such as by mechanical bonding, thermal bonding, or adhesive bonding, to form a fixed-fiber batt. In this regard, a fibrous mat and/or a fixed fiber mat may be used in a variety of applications, including filtration, construction materials, incorporation into structural composites, incorporation in to ballistic resistant materials, etc.

In another aspect, embodiments of the present invention provide a composite including a plurality of nanofibers comprising a polyamide as described and disclosed herein. In accordance with certain embodiments of the invention, the plurality of nanofibers may comprise a polyamide (e.g., a para-aramid) including at least one substituted phenyl group (e.g., a halogen-substituted phenyl group) as described and disclosed herein. In accordance with certain embodiments of the invention, the plurality of nanofibers may have an average diameter from about 50 to about 1000 nm. By way of example only, the plurality of nanofibers may comprise a polyamide including at least one halogen-substituted phenyl group. In accordance with certain embodiments of the invention, the composite may also include a continuous matrix resin, in which the plurality of nanofibers is at least partially embedded within the continuous matrix resin. In accordance with certain embodiments of the invention, the continuous matrix resin may comprise a variety of polymeric materials (e.g., a polyamide, a polyurethane, a polyolefin, a polyester, an epoxy, etc.).

In accordance with certain embodiments of the invention, the plurality of nanofibers comprising a polyamide as described and disclosed herein may be provided in the form of one or more fibrous mats as described and disclosed herein. In accordance with certain embodiments of the invention, the one or more fibrous mats may be laid-up in a variety of different configurations (e.g., lay-up orientations). For example, a plurality of individual fibrous mats may be subjected to a variety of lay-up orientations relative to each other (e.g., parallel-laid, orthogonally-laid, etc.). Each of the fibrous mats may be independently laid relative to adjacent fibrous mats. By way of example only, certain embodiments of the invention may comprise a first fibrous mat being aligned in a first direction laid directly or indirectly onto or over a second fibrous mat being aligned in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction). For example, a [0/90] lay-up orientation references a first fibrous mat aligned in a direction considered to be at 0° (as a point of reference) and a second fibrous mat laid on top or over the first fibrous mat, in which the second fibrous mat is aligned in a direction 90° relative to the alignment of the first fibrous mat. In accordance with certain embodiments, the laid-up fibrous mats may define a fiber batt. The formed batt may be fixed, such as by mechanical bonding, thermal bonding, or adhesive bonding, to form a fixed-fiber batt. In accordance with certain embodiments of the invention, the fibrous mat or fixed-fiber batt may be subjected to a polymeric molding operation (e.g., compression molding, injection molding, etc.) in which the fibrous mat or fixed-fiber batt is at least partially (e.g., completely) surrounded by the matrix resin to form a composite including a plurality of nanofibers formed from a polyamide as described and disclosed herein. In accordance with certain embodiments of the invention, the plurality of nanofibers may comprise and/or function as at least one reinforcing layer. In accordance with certain embodiments of the invention, the composite's physical properties (e.g., tensile strength, ballistic performance, etc.) may me mostly or substantially attributed to the reinforcing layer or layers of the plurality of nanofibers. In accordance with certain embodiments of the invention, for instance, the continuous matrix may, although not necessarily, mostly function to confine and/or bond the plurality of fibers and/or to facilitate formation of a particular geometrical shape of the composite.

In accordance with certain embodiments of the invention, the composite may also comprise at least one interlayer comprising a fabric of thermoplastic fibers and/or a film of a thermoplastic. In accordance with certain embodiments of the invention, the interlayer may be formed from a thermoplastic that is different than the plurality of nanofibers. In accordance with certain embodiments of the invention, one or more interlayers may be positioned between one or more fibrous mats comprising a plurality of nanofibers as disclosed and described herein. In accordance with certain embodiments of the invention, for example, the composite may include a plurality of interlayers that each comprising a fabric of thermoplastic fibers that are different than the plurality of nanofibers. For example, the plurality of nanofibers may comprise a plurality of reinforcing layers and the interlayers may be disposed alternately between the reinforcing layers. In accordance with certain embodiments of the invention, the plurality of interlayers and the plurality of reinforcing layers may be at least partially embedded within the continuous matrix resin.

In accordance with certain embodiments of the invention, the composite may comprise a structural component of a vehicle (e.g., spacecraft, aircraft, tank, automobile, personnel carrier, etc.), a construction material (e.g., a building panel), a protective article of clothing (e.g., ballistic resistant clothing, such as a jacket or helmet), or a barrier material (e.g., road block).

In accordance with certain embodiments of the invention, the nanofibers (as described and disclosed herein) of the composite may improve one or more of the composite's tensile strength, tear strength, work of fracture V-50 (ballistic performance) to a greater extent that than any increase in areal density of a comparative layer of fibers or mat of fibers.

In another aspect, embodiments of the present invention provide a method of forming a nanofiber. The method may comprise forming or providing a polyamide as described and disclosed herein. In accordance with certain embodiments of the invention, the polyamide (e.g., a para-aramid) may include at least one substituted phenyl group (e.g., a halogen-substituted phenyl group) as described and disclosed herein. In accordance with certain embodiments of the invention, the nanofiber may have an average diameter from about 50 to about 1000 nm. For example, the polyamide may comprise at least one halogen-substituted phenyl group. In accordance with certain embodiments of the invention, the method may also comprise dissolving a salt and the polyamide in an organic solvent to form a polymer solution, in which the polymer solution comprises from about 3% to about 30% by weight of the polyamide and from about 1% to about 10% by weight of the salt. In accordance with certain embodiments of the invention, the method may comprise forming a supernatant layer and an anisotropic phase layer (e.g., a liquid-crystalline phase layer of the polyamide) from the polymer solution, such as by centrifuging the polymer solution. In accordance with certain embodiments of the invention, the method may also include separating the anisotropic phase layer from the supernatant layer. In accordance with certain embodiments of the invention, the method may also include electrospinning the anisotropic phase to form the nanofiber.

FIG. 1, for instance, illustrates a flow diagram for a method 200 of forming a nanofiber in accordance with certain embodiments of the invention, in which the method 200 may comprise forming or providing a polyamide including at least one substituted phenyl group, such as a halogen-substituted phenyl group, in operation 210. The method 200 may also comprise dissolving a salt and the polyamide in an organic solvent to form a polymer solution, in which the polymer solution comprises from about 3% to about 30% by weight of the polyamide and from about 1% to about 10% by weight of the salt as operation 220. The method may further comprise centrifuging the polymer solution to form a supernatant layer and an anisotropic phase layer at operation 230. The method may also comprise separating the anisotropic phase layer from the supernatant layer at operation 240. The method may also comprise electrospinning the anisotropic phase to form the nanofiber at operation 250. Although FIG. 1 illustrates that polyamide as including at least one halogen-substituted phenyl group, methods of forming a nanofiber may comprise any polyamide as described and disclosed herein.

In accordance with certain embodiments of the invention, the method comprises forming the polyamide, in which the reaction between the monomers (e.g., Monomer A—Formula 2, Monomer B—Formula 3, and optionally Monomer C—Formula 4, as disclosed above) is performed in an inert environment (e.g., in the absence of oxygen gas). In accordance with certain embodiments, each of the monomers utilized in the reaction may be pre-chilled (e.g., from 5° C. to −15° C., or from about 0° C. to −10° C.) and admixed together to initiate the reaction. In accordance with certain embodiments of the invention, the reaction may be allowed to warm to ambient temperature after initiation of the reaction. After the reaction has been completed, in accordance with certain embodiments of the invention, water may be added to the resulting reaction mixture to precipitate the raw polyamide. In accordance with certain embodiments of the invention, the raw polyamide formed from the reaction is obtained (e.g., via filtering) and optionally washed with water and/or acetone prior to being dried to provide a purified polyamide. In accordance with certain embodiments of the invention, the purified polyamide may be re-dissolved with an appropriate solvent (e.g., N,N-dimethylacetamide) along with a salt, such as lithium chloride (LiCl) to form a polymer solution. The anisotropic solution may be subjected to a centrifuging operation, for example, to form the supernatant top layer of lower molecular weight polyamide chains and a lower anisotropic phase having relatively larger molecular weight polyamide chains. In accordance with certain embodiments of the invention, the lower anisotropic phase may be subjected to an electrospinning process to form the nanofiber. As noted above, the nanofiber formed may comprise any polyamide as described and disclosed herein.

In accordance with certain embodiments of the invention, for example, the method may comprise forming the polyamide by reacting (i) Monomer A, (ii) Monomer B, and optionally (iii) Monomer C, in which Monomer A is selected from one or more compounds according to Formula (2), Monomer B is selected from one or more compounds according to Formula (3), and Monomer C is selected from one or more compounds according to Formula (4):

Formula (2)

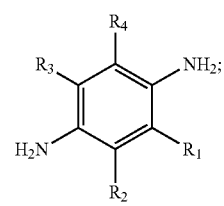

Formula (3)

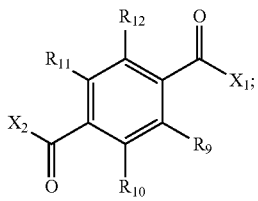

Formula (4)

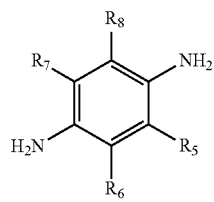

wherein $R_1$, $R_2$, $R_3$, $R_4$, $R_5$, $R_6$, $R_7$, $R_8$, $R_9$, $R_{10}$, $R_{11}$, and $R_{12}$ are each independently selected from H, a halogen, a saturated aliphatic radical having from 1 to 30 carbon atoms, an unsaturated aliphatic radical having from 1 to 30 carbon atoms, a nitro group, a carboxylic acid radical, or an ether radical;

wherein $X_1$ and $X_2$ are each independently selected from a halogen;

wherein coefficient L is the relative number of moles for Monomer A with respect to a total number of moles for Monomers A through C, coefficient M is the relative number of moles of Monomer B with respect to the total number of moles for Monomers A through C, and coefficient N is the relative number of moles of Monomer C with respect to the total number of moles for Monomers A through C; and wherein L+N=M, and L+M+N=1.

In accordance with certain embodiments of the invention, L and N are each not zero and a ratio between L and N may comprise more than 4:1, or at least about 3:1, or at least about 2.5:1, or at least about 1.2:1, or at least about 3:2, or at least about 1:1.

In accordance with certain embodiments of the invention, $R_1$ and $R_2$ each are not hydrogen. For example, each of $R_1$ and $R_2$ may comprise a halogen, an alkyl group, or a nitro group. In accordance with certain embodiments of the invention N and L are not zero, and N is greater than L. In accordance with certain embodiments of the invention, a ratio between N and L may comprise more than 1.2:1, such as at least about 1.25:1, at least about 1.3:1, at least about 1.5:1, at least about 1.75:1, at least about 2:1, at least about 2.5:1, at least about 3:1, at least about 4:1, at least about 5:1, at least about 6:1, at least about 7:1, at least about 8:1, or at least about 9:1.

In accordance with certain embodiments of the invention, the solubility of the polyamide in a variety of solvents may be tailored by selecting the appropriate substitutions on the phenyl rings of the polyamide. Non-limiting examples of solvents include N,N-dimethyl formamide (DMF), dimethylsulfoxide (DMSO), N-methylpyrollidinone (NMP).

In accordance with certain embodiments of the invention, the method may further comprise controlling the relative humidity of the atmosphere during electrospinning between about 30% RH to about 65% RH, such as at least about any of the following: 30, 35, 40, 45, and 50% RH and/or at most about any of the following: 65, 60, 55, 50, and 45% RH.

EXAMPLES

The present disclosure is further illustrated by the following examples, which in no way should be construed as being limiting. That is, the specific features described in the following examples are merely illustrative and not limiting.

The following working examples illustrate a scalable, bottom-up chemical synthesis and electrospinning of Cl-substituted poly(para-phenylene terephthalamide) (PPTA) nanofibers. To achieve Cl-PPTA nanofibers, the chemical reaction between the monomers was controlled, and dissolution of the polymer into solvent was tailored to enable anisotropic solution formation and sufficient entanglement molecular weight. Electrospinning processing parameters were studied to understand their effects on fiber formation and mat morphology to yield consistently high quality fibers. Importantly, the control of relative humidity during the fiber formation process was found to be important, likely since water promotes hydrogen bond formation between the PPTA chains. The fiber and mat morphologies resulting from different combinations of chemistry and spinning conditions were observed using scanning electron microscopy and observations were evaluated. Tensile properties of single Cl-PPTA nanofibers were characterized for the first time using a nanomanipulator mounted inside a scanning electron microscope, and fiber moduli measuring up to 70 GPa and strengths exceeding 1 GPa were achieved. Given the excellent mechanical properties measured for the nanofibers, this chemical synthesis procedure and electrospinning protocol appear to be a beneficial route for producing a new class of nanofibers with ultrahigh strength and stiffness.

Experimental

Materials

Dichloromethane, sodium bicarbonate, terephthaloyl chloride (TC; >99%), acetone (>99.5%), hexamethylphosphoramide (HMPA; >98%, anhydrous), lithium chloride (LiCl; >99%, anhydrous), and N,N-dimethylacetamide (DMAc; 99.8%, anhydrous) were purchased from Sigma-Aldrich. 2-chloro-1,4-phenylenediamine sulfate (>98.0%) was purchased from TCI America. All chemicals were utilized without further purification, and stored in an inert atmosphere. All glassware was flame dried before polymerization reactions were performed.

Cl-PPTA Synthesis Procedure

The 2-chloro-1,4-phenylenediamine was free-based before polymerization. The phenylenediamine salt was added to a separatory funnel with dichloromethane and saturated sodium bicarbonate. After all of the salt dissolved and the bubbling subsided, the organic layer was collected, dried with magnesium sulfate, filtered, and the dichloromethane removed in vacuo.

In an argon-filled glove box, 2-chloro-1,4-phenylenediamine (33.1 g, 0.232 mol) was weighed into a 1 L round bottom flask and 400 mL of HMPA was added. Separately, terephthaloyl chloride (47.2 g, 0.232 mol) was weighed into a 500 mL round bottom flask and 150 mL of HMPA was added. The round bottom flasks were sealed, removed from the glove box, and the flasks were sonicated for 10 minutes to dissolve the solids. The terephthaloyl chloride solution was chilled in an ice water bath and the phenylenediamine was chilled in an acetone ice bath to between −5 and −10° C. Once both solutions were chilled, the terephthaloyl chloride solution was transferred portion-wise to the phenylenediamine solution via a cannula (16 G) over the course of 15 minutes.

After the transfer was complete, the reaction was allowed to warm to room temperature and stirred overnight. The reaction mixture was transferred to a stainless steel blender and 500 mL water was added. The mixture was blended for one minute, and the solid polymer was filtered. The water wash in the blender was repeated two more times followed by two washes in the blender with 500 mL acetone. The resulting polymer was placed in a crystallization dish in a vacuum oven at 75° C. overnight. After the drying was complete, the powder was homogenized in a planetary ball mill (300 rpm) for one hour and placed back in the vacuum oven at 75° C. overnight.

Dissolution of Polymer Solutions

Once the polymer was purified and dried, it was further dissolved in a solution of N,N-dimethylacetamide (DMAc) and lithium chloride (LiCl). To determine optimal dissolution conditions, and subsequently optimal solution characteristics for electrospinning, varying concentrations of polymer and salt were evaluated. Stock solutions of DMAc and LiCl were prepared with LiCl concentrations varying from 1-5% by weight and stored in an argon filled glovebox. Dried Cl-PPTA powder was dissolved in DMAc/LiCl solutions at concentrations from 5 to 25% by weight. If the polymer dissolved, the anisotropic solutions were transferred to a centrifuge following full dissolution and spun at 8000 rpm for 1 hour for homogenization. Depending on the chemistry conditions, the solution sometimes resulted in a solution that separated into two layers. The top layer was assumed to be comprised of lower molecular weight oligomers and was discarded. The bottom anisotropic layer was used for electrospinning and stored in a glovebox when not in use.

Electrospinning

Anisotropic solutions were evaluated for compatibility with the electrospinning process. Electrospinning was done using a single-needle setup on an Inovenso NE300 electrospinning machine. The solution was loaded into a syringe and pumped through an 18-gauge needle using a syringe pump. Electrospinning conditions, including flow rate, voltage and distance to the drum, were varied to achieve a stable Taylor cone and continuous fibers; the specific conditions varied depending on solution chemistry. Drum rotation speed, up to 2000 rotations per minute (RPM), was used to control fiber alignment. Relative humidity inside the electrospinning chamber was also controlled. Fibers were spun onto non-stick aluminum foil that was wrapped around the drum. Spin time was used to control areal density of the fiber mat.

Annealing

Annealing of electrospun fibers was performed prior to mechanical testing, in some cases, to enable investigation of effects on mechanical properties. For mat tension samples, mats were annealed both with and without applied tension. To anneal under tension, mats were clamped at each end and stretched until taut such that they were held under enough applied tension to prevent shrinkage when exposed to 150° C. for one hour. For single fiber tension samples, mats were rolled into a yarn and then adhered to a 30 mm length frame with adhesive. The frame was placed in the TA instruments RSA GII and annealed at 150° C. under 25 g tension for one hour. Annealing at 150° C. was chosen based on previously performed temperature and time sweeps that indicated a modulus increase at this temperature.

Scanning Electron Microscopy

Nanofibers and nanofiber mats were imaged using an FEI Scios Scanning Electron Microscope (SEM). The imaging was performed in order to determine the best polymer and LiCl concentration based on the fabricated fiber morphology and residual salt. Imaging was also done to determine what spin parameters resulted in the best mat alignment. In order to maintain the original fiber alignment, mats were punched out from the foil they were spun on and the foil was adhered directly to a standard SEM stub. In order to quantify the orientation of the mats, an ImageJ plug-in was used to determine the coherency percent or preferred orientation of mats spun using different conditions.

Fiber Diameter Measurements

The distribution of fiber diameters was approximated from a series of five SEM images, captured from various regions on the mat. Each image was captured at a 5 kV acceleration voltage, using 0.10 nA of beam current, at a 15 kX magnification (approximate area of 127 $\mu m^2$ per image). The exported images were then imported into ImageJ to measure the diameters of the fibers. The method consisted of overlaying a triangle on the image so that it covers a majority of the area, and measuring the diameter of the fibers that intersect its sides. An approximately equilateral triangle is chosen as to minimize the influence of any directional bias. The measurements were taken with the 2D measurement tool in ImageJ, using the scale bar and pixel intensity line-profile for increased precision. Approximately 30 measurements were taken from each individual image, for a total of 158 measurements collectively.

Nanofiber Mat Tension Tests

Stress-strain behavior of nanofiber mats was measured on an Instron 5942 with a 5 N load cell and pneumatic grips exerting 20 psi of pressure. Prior to the tensile testing, 40×10 mm samples were punched out nanofiber mats using a steel rule die. The samples were gripped using a paper towel (to aid with handling). BlueHill2 Software was used to control the testing, which was performed at a constant extension rate of 50 mm/min over a gauge length of 20 mm. Load and extension were recorded, and used to subsequently calculate strain and tensile strength.

Single Nanofiber Tensile Tests

Quasi-static single fiber tensile experiments were performed using a Kleindiek nanomanipulator and a cantilever stage mechanism inside of an FEI SEM. The single fibers were extracted from the electrospun mats and adhered first to the cantilever stage, and then to the tip of the nanomanipulator probe using an adhesive that cures when exposed to the electron beam at high current (Kleindiek Nanotechnik, SEMGLU). The electron beam was used to cure the adhesive at a beam current of 1.6 nA and exposure for 4 minutes. Multiple 1.5 p.m×2 μm areas around the fiber were cured to ensure a strong bond to the stage and the probe. The probe was aligned with the fiber to enable fiber deformation perpendicular to the cantilever stage. The nanomanipulator was actuated in approximately 0.5 pm increments, and SEM images were acquired at each step. Image analysis was then used to track the motion of the cantilever stage and the motion of the probe. The cantilever stage had a calibrated stiffness of 11.5 mN/pm, so by tracking its motion the force in the fiber was quantified, and the resulting stress was calculated. Tracking the motion of the probe enabled measurement of displacement and subsequent calculation of strain. Thus, stress-strain plots for each individual nanofiber were determined.

Results and Discussion

Polymer Synthesis

In order to achieve adequate solubility in a solvent that is suitable for electrospinning, 2-chloro-1,4-phenylene diamine was used. The presence of the chlorine atom on the aramid back bone leads to molecular kinking and improves diffusion of the electrospinning solvent. The general procedure for the synthesis of Cl-PPTA produced a polymer with sufficient solubility and high anisotropy for reliable electrospinning.

The reaction between terephthaloyl chloride and 2-chloro-1,4-phenylene diamine is exothermic. As a result, the reaction was performed at a lower temperature in order to better control the polymerization process as shown in Reaction Scheme (1) provided below. The reaction temperature was controlled with an acetone ice bath to keep the temperature of the phenylene diamine solution between −5 and −10° C. These low temperature conditions led to increased reaction times, yielding a solution with higher viscosity and a polymer with increased anisotropy than was obtained using any other previously reported conditions.

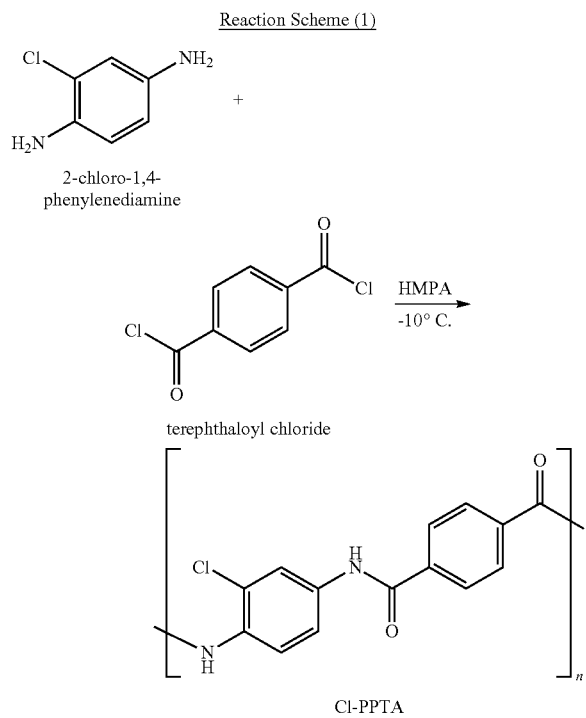

Figure 2:
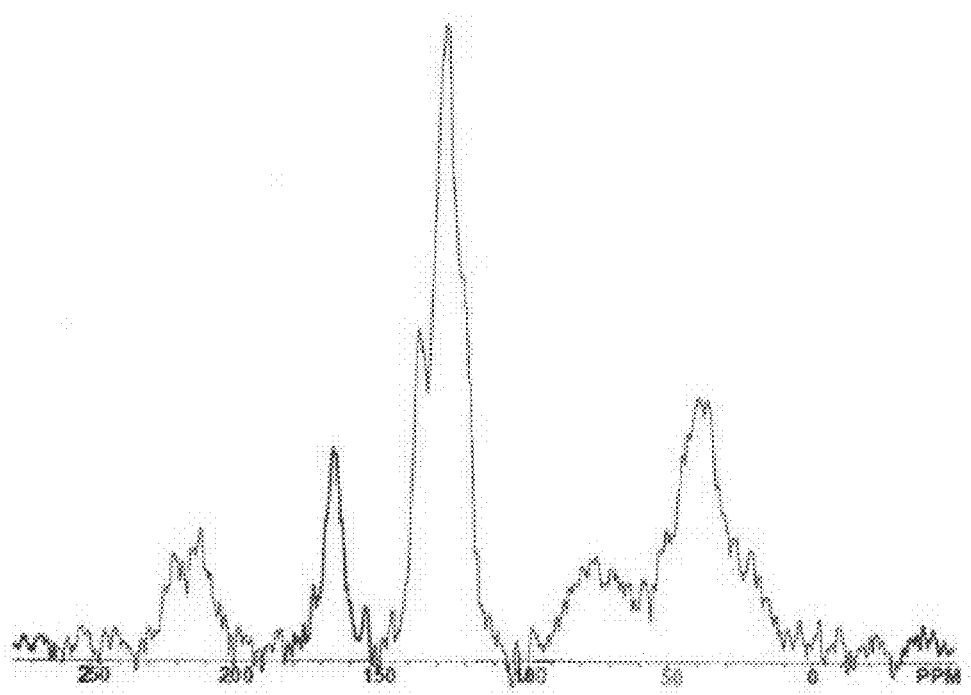
FIG. 2 illustrates a solid-state $^{13}C$ NMR analysis of a Cl-PPTA polymer.

In order to confirm the structure, solid-state $^{13}$C NMR analysis of the resulting material was performed. The results are shown in FIG. 2. The broad peaks between 110-140 ppm are the aromatic carbons in the backbone and the smaller peak at 165 ppm results from the carbonyl carbons of the amides.

Solubility & Solution Characteristics

Figures 3A, 3B, 3C:
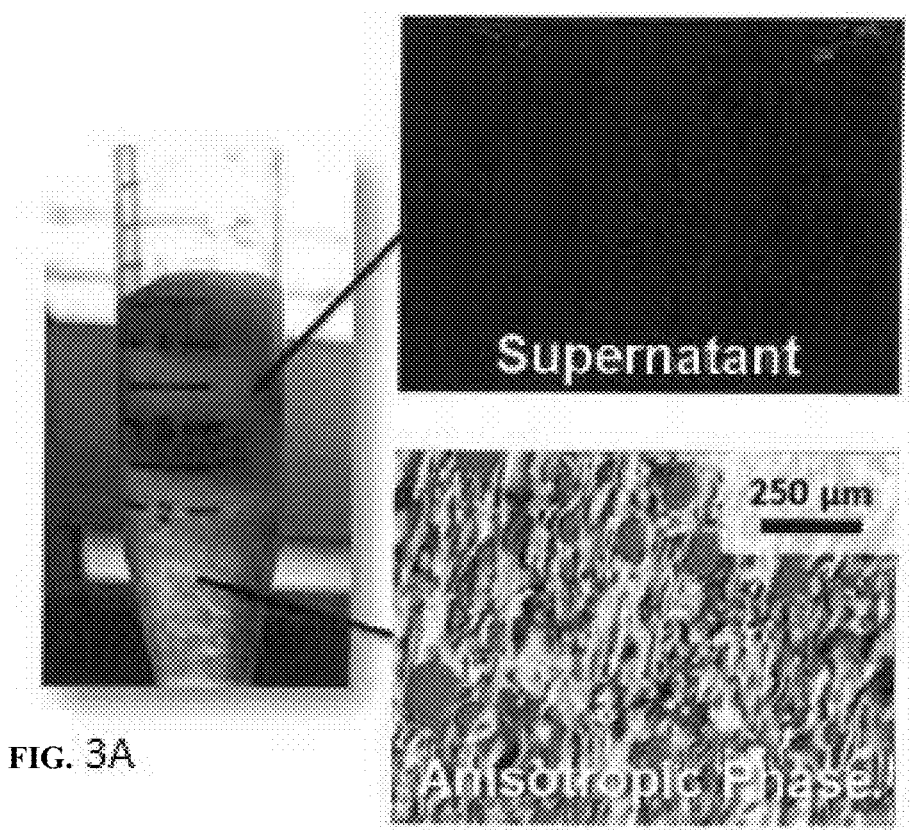
FIG. 3A shows a polymer solution after being centrifuged according to certain embodiments of the invention.
FIG. 3B shows the top supernatant layer from FIG. 3A.
FIG. 3C shows the bottom anisotropic phase (e.g., liquid-crystalline) from FIG. 3A.
Figure 4:
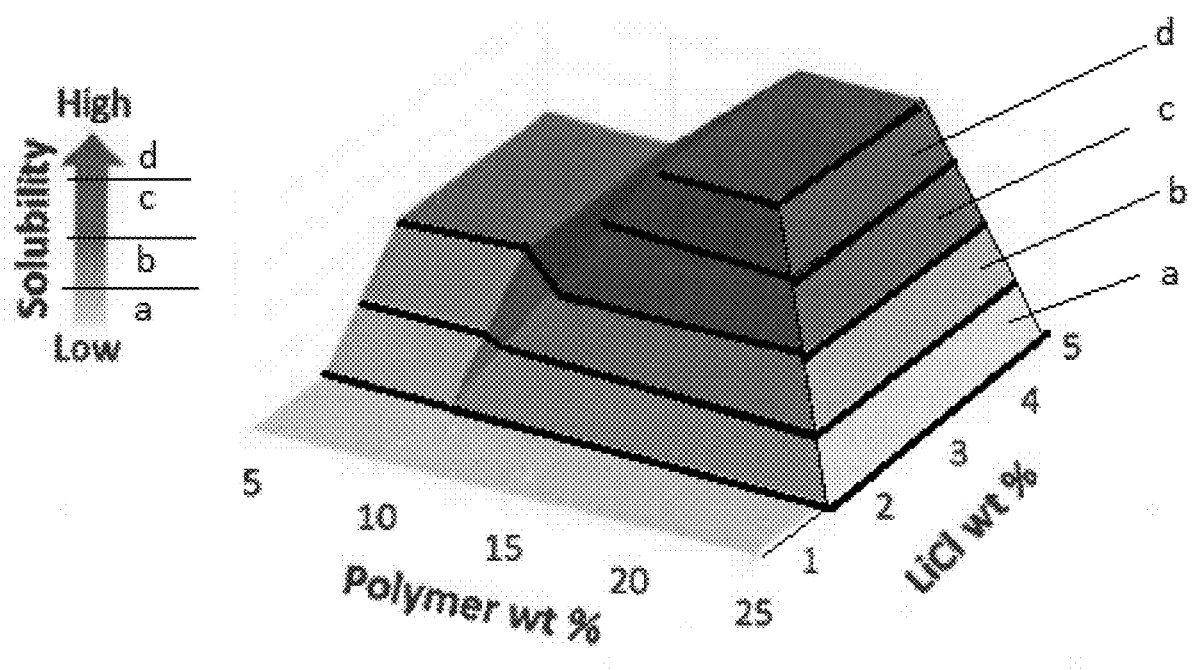
FIG. 4 illustrates a solubility diagram in accordance with certain embodiments of the invention.

To facilitate reliable electrospinning, the Cl-PPTA polymer needed to be fully soluble in the electrospinning solvent. Further, the polymer solution needed to have sufficient viscosity for maintaining chain entanglements as well as adequate electrical conductivity. In order to achieve this, dissolution of varying concentrations of Cl-PPTA polymer in different DMAc and LiCl salt mixtures was studied. Polymer concentrations ranging from 5-25 wt % were dissolved (polymer concentrations of 25 wt % and above were insoluble), in combination with salt concentrations from 1-5 wt %. FIG. 3A shows an example of a solution with anisotropic characteristics following centrifugation, while FIG. 3B shows a magnified view of the top supernatant layer and FIG. 3C shows a magnified view of the bottom anisotropic phase. Obvious phase separation occurred as shown in FIG. 3A, which resulted in a higher viscosity anisotropic phase on the bottom as also illustrated by FIG. 3C. A solubility diagram, which is shown in FIG. 4, displays the extent of solubility resulting from each combination of polymer, LiCl, and DMAc. The diagram displays, using a color gradient and a letter gradient from 'a' to 'd', the range of solubility from conditions that did not lead to dissolution (lightest blue or 'a'), to those that dissolved but did not yield an anisotropic solution (medium blue or 'b'), to those that dissolved fully and yielded an anisotropic phase (dark blue or 'c' to 'd'). As can be seen, a minimum of 3% LiCl was required to achieve full polymer dissolution for this particular system. Additionally, a polymer percentage of at least 15%, but less than 25%, was required to achieve the formation of the anisotropic phase for this particular system, which was desirable for the electrospinning process control as well as optimum nanofiber performance. By tailoring polymer concentration as well as LiCl percentage in the solution, the relative proportion of anisotropic phase could be tailored and maximized. As such, solutions composed of polymer concentrations ranging from 15-25%, and LiCl concentrations ranging from 3-5% were further explored via electrospinning Down-Selection of Solution Concentrations Once the subset of solutions yielding anisotropic characteristics was identified to be from 15 to 25% polymer concentration for this particular system, solutions were further evaluated for electrospinnability. To start, electrospinning was performed with an 18-gauge needle, from which solution was dispensed at a 1-3 mL/hr flow rate under a voltage of 20-30 kV onto a collector, 2.5-7.5 cm away, rotating at 500 RPM. Based on observation, the conditions were adjusted within the aforementioned ranges for the formation of the Taylor cone and yield fibers from each solution. The best fiber spinning conditions were recorded for each solution. Following initial trials and observations, solutions were prepared in smaller polymer concentration increments within the 15-25 wt % range to evaluate for electrospinnability and to narrow in on optimal solution conditions. Some solutions, primarily at the lower end of the concentration range (e.g., 15-16% polymer) formed an inconsistent Taylor cone, leading to spitting of solvent in addition to fiber formation. As concentration increased further (e.g., 18-22 wt %), fibers were consistently formed. Above 22% (with 3 wt % LiCl), polymer concentration was high enough that the needle clogged during spinning.

Figure 5A:
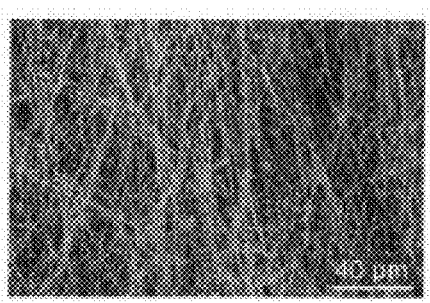
FIGS. 5A-5D illustrate a comparison of SEM images of the mats spun from solutions with different polymer/LiCl concentrations.
Figure 5B:
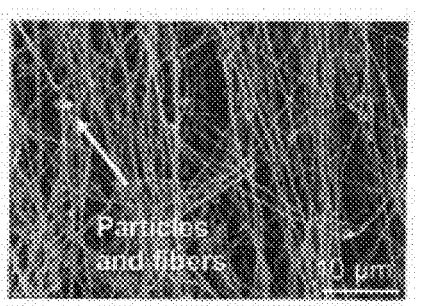
Figure 5C:
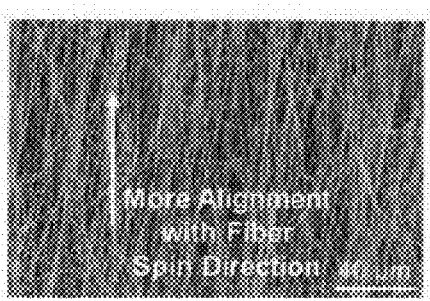
Figure 5D:
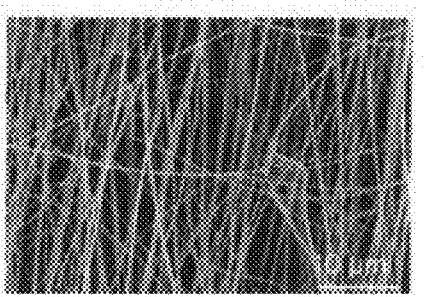

SEM imaging was performed to help determine the optimal polymer and LiCl concentrations to yield good quality fibers. FIGS. 5A-5D provide a comparison of SEM images of the mats spun from solutions with different polymer/LiCl concentrations. Although it was found that 3% LiCl was required to achieve dissolution, the LiCl-to-polymer ratio also needed to be optimized to prevent excess LiCl from remaining in solution and resulting in particles amongst the electrospun fibers. FIG. 5A (40 µm) and 5B (10 µm) shows images of electrospun fibers made from solution comprised of 16% polymer and 3% LiCl, revealing evidence of excess LiCl in the form of salt particles within the nanofiber mat. However, when the salt-to-polymer ratio was adjusted by increasing the amount of polymer to 18-22 wt %, the amount of LiCl no longer resulted in excess salt particles and homogeneous fibers were formed as shown in FIG. 5C (40 µm) and 5D (10 µm). Solutions composed of polymer in the 18-22 wt % range (with 3% LiCl) showed negligible differences in resulting fiber quality as a function of polymer concentration. As a result, 20 wt % was chosen for further exploration since it seemed to be safely in the optimal zone for solution composition and salt-to-polymer ratio for achieving continuous fiber formation. Although 4-5% LiCl also led to dissolution, excess salt particles were observed in the polymer range up to 25%, above which dissolution did not occur.

Optimization of Electrospinning Conditions—Humidity

Figure 6A:
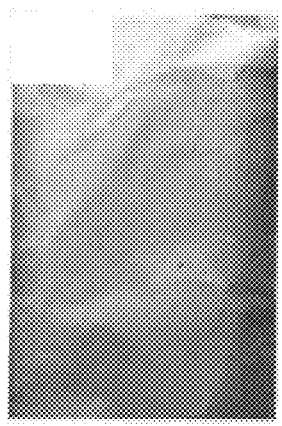
FIGS. 6A-6D illustrate a comparison of fibrous mats.
Figure 6B:
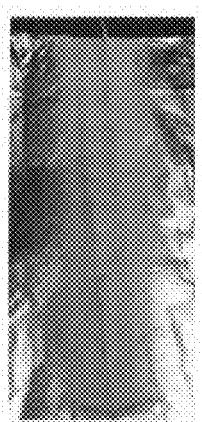
Figure 6C:
Figure 6D:
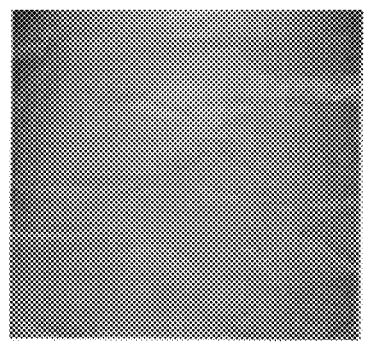

After the solution comprised of 20 wt % polymer and 3 wt % LiCl had been identified as optimal in initial trials, electrospinning conditions were further refined to achieve consistent, uniform fiber mats with aligned fibers. The combination of a flow rate of 2 mL/hr and voltage of 24 kV yielded continuous fibers on the drum when it was positioned at a distance of 5 cm from the syringe. Even after determining a set of electrospinning conditions that yielded continuous nanofibers, it was found that fiber quality was inconsistent from day to day, with some days yielding flat mats of relatively aligned fibers, and other days yielding irregular mats with fibers grouped in ridges as shown in FIGS. 6A-6C, and other days when fibers would not form at all. FIG. 6A shows a flat mat of aligned fibers, FIG. 6B shows fibers in ridges, and FIG. 6C shows a fur pattern. FIG. 6D shows a mat formed under controlled RH of 44% to form a uniform fibrous mat. Observed correlations between the weather and fiber quality led to the hypothesis that humidity played an important role in the fiber formation process during electrospinning.

Humidity can impact hydrogen bond formation, one of many factors that can affect the mechanical properties of polyaramid type polymers. The presence of hydrogen bonding is particularly important due to the presence of amide groups on the polyaramid backbone. To investigate humidity effects, electrospinning at different levels of relative humidity were performed and studied to evaluate the impact on the spinnability of the polymer. During the spinning process, a humidifier was integrated into the electrospinner to enable control of relative humidity (%RH). Relative humidity was varied from less than 30% to greater than 65%. It was found that no fibers could be formed at <30% RH for this particular system. Between 30% and 40% RH, fibers were formed but assembled into irregular mats with ridges for this particular system. Above 65% RH, the syringe became clogged as polymer precipitated during extrusion. The optimum RH for this particular system was found to be between 40% and 65% RH. In this humidity range, uniform, long nanofibers were formed, as can be seen in FIGS. 6C-6D. Accordingly, all subsequent electrospinning was performed in the middle of this range, at an RH of 50%. The effect of relative humidity on fiber formation and mat quality for this particular system is summarized in Table 1.

TABLE 1

| Relative Humidity | Mat Quality |
| --- | --- |
| <30% | Absolutely no fibers |
| 30-40% | Fibers, but irregular mats with ridges |
| 40-65% | Longer Fibers, relatively aligned in flat mat |
| >65% | Syringe becomes clogged, polymer precipitating during extrusion |

Electrospinning Conditions

Figure 7A:
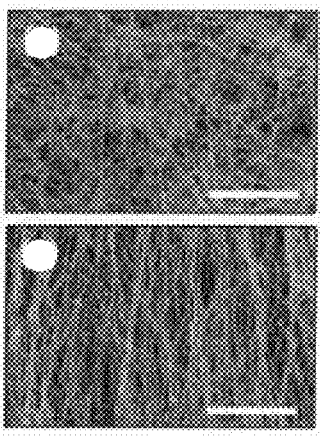
FIGS. 7A-7D illustrates a comparison of fiber alignment for fibrous mats formed from varying drum rotation speeds.
Figure 7B:
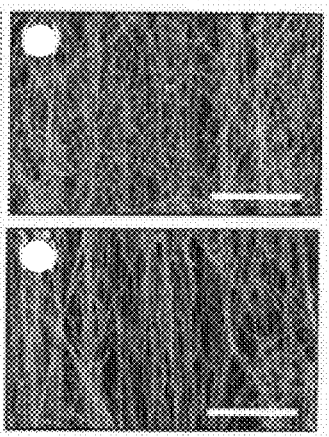
Figure 7C:
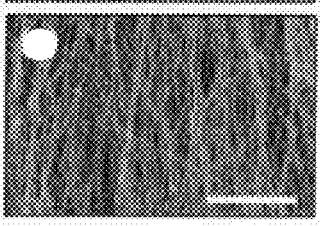
Figure 7D:
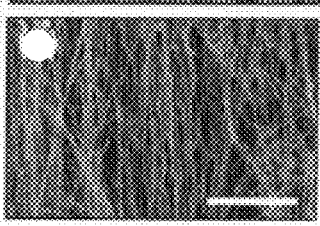
Figure 7E:
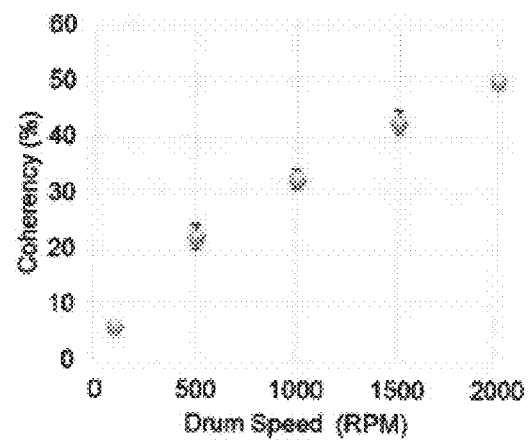
FIG. 7E illustrates a graph of the coherency as a function of drum rotation speed.

It has been shown that fiber alignment increases with drum angular speed (RPM) during electrospinning, and tensile properties correlate with alignment since morphology is more uniform and stresses can more easily distribute over all fibers. As a result, once relative humidity was controlled and continuous fibers could be consistently formed, the effects of drum speed were explored via mat tension tests to facilitate choosing a rotation speed for optimal fiber synthesis. Mats for these tests were electrospun from a DMAc solution containing 20 wt % polymer and 3 wt % LiCl, using a flow rate of 3 mL/hr onto the collector, which was 5 cm away, under controlled humidity. A higher flow rate was used for these tests to ensure mats were robust enough for handling and testing. By varying only drum velocity, the effects of drum rotation were studied and can be seen in the images of FIGS. 7A-7D. It can be seen that the fibers transition from randomly oriented when spun at 100 RPM, as shown in FIG. 7A, to reasonably aligned at 2000 RPM, as shown in FIG. 7D. FIG. 7B shows the fiber alignment when spun at 500 RPM and FIG. 7C shows the fiber alignment when spun at 1000 RPM. In addition to the qualitative observation of improved fiber alignment, an ImageJ plug-in was used to determine the coherency percent, or preferred orientation, of mats spun at different RPMs. It was found that the coherency of the mats spun at 100 RPM was 6%, whereas the coherency increased to 50% at 2000 RPM. FIG. 7E shows a graph of the coherency as a function of drum rotation speed (RPM). This trend from randomly oriented to aligned suggests that 100 RPM is below the fiber take-up speed, whereas at higher RPMs a higher centrifugal force is developed near the circumference of the rotating drum, thus elongating and aligning the fibers before they are collected. Although the alignment and coherency achieved at 2000 RPM was higher than that achieved at 1500 RPM, fibers sometimes did not adhere well to the drum at 2000 RPM, depending on the substrate, as a result of varying charge dissipation and repulsion. As such, fibers spun at 1500 RPM were selected for single fiber tensile testing since these conditions maximized alignment while still yielding fibers on the substrates required for characterization.

Mat tensile behavior was characterized as a function of electrospinning drum speed. Examples of the stress-strain behavior exhibited by nanofiber mats are shown FIG. 8A, and Table 2 provides a summary of the measured properties averaged over eight samples for each drum speed.

TABLE 2

| RPM | Strain at Peak (%) | Ultimate Tensile Strength (MPa) | Mat Stiffness (MPa) |
| --- | --- | --- | --- |
| 100 | 22 ± 3 | 1.80 ± 0.61 | 8.76 ± 4.0 |
| 500 | 6 ± 4 | 2.46 ± 0.57 | 86.0 ± 41.2 |
| 1000 | 2.5 ± 0.6 | 3.35 ± 0.61 | 183.9 ± 40.6 |
| 1500 | 2.4 ± 0.5 | 2.49 ± 0.47 | 139.9 ± 37.2 |

It can be seen that there is a distinct transition in mechanical behavior between 100 RPM mats and 500 RPM mats, between which there is a transition from randomly oriented to aligned fibers. This morphology change manifests in a transition from very high strain to very high stiffness and lower overall mat elasticity. As coherency increased further with RPM, stiffness and strength also increased to a point; values measured for 1000 RPM and 1500 RPM mats were statistically different. Photographs taken during tensile testing also reveal insights into differences in failure modes as a function of RPM and fiber alignment. FIG. 8B shows a series of photographs during tensile testing of a 100 RPM mat, and the failure was localized in the center of the gauge length. The random fiber arrangement likely contributes to the high level of elasticity exhibited by these mats since fibers entangle around one another, thus enabling significant levels of strain in the mat. For the 1500 RPM mats, on the other hand, shown in FIG. 8C, the failure occurs over much of the gauge length and the effect of fiber alignment can clearly be seen. Rather than entanglement contributing to mat strain, failures are dictated by strengths of individual fibers.

Figure 9:
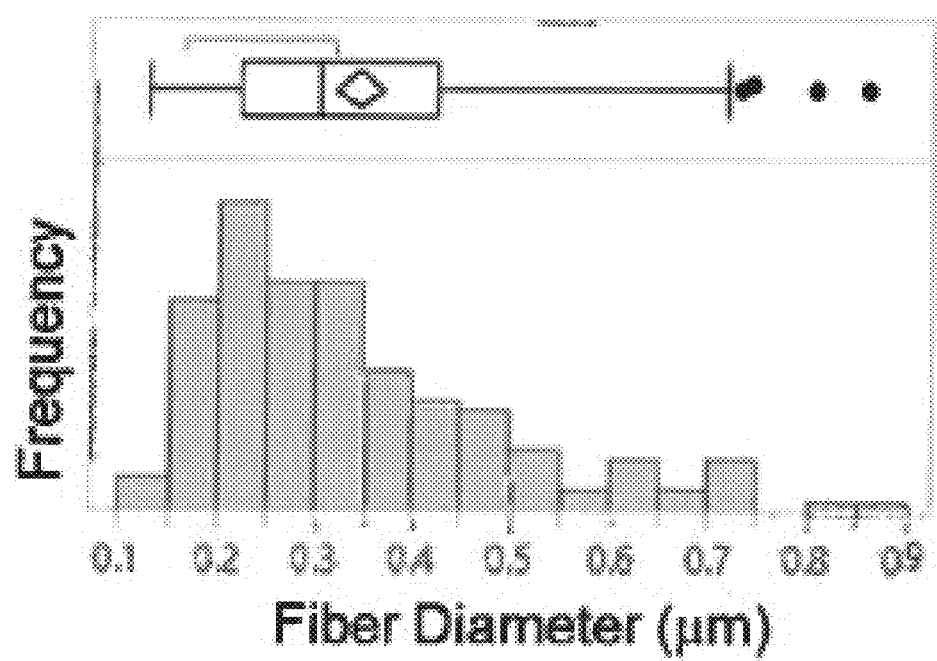
FIG. 9 shows a histogram of diameters of nanofibers in accordance with certain embodiments of the invention.

Overall, it was clear that drum speed influenced mat morphology by increasing fiber alignment. This, in turn, caused a transition in failure mode during tensile tests, and a resulting transition from high elasticity caused by entangled fibers to high stiffness caused by aligned fibers. To maximize strength and stiffness, aligned mats spun from higher RPM spinning are desirable, although too high (2000 RPM) was found to lead to mat quality challenges. Although the strength and stiffness of mats spun at 1000 RPM and 1500 RPM were similar, 1500 RPM was utilized going forward given that the coherency values were higher and prior literature suggests mechanical properties improvements with higher alignment due to more uniform morphology and denser lateral packing. Morphology of mats spun at 1500 RPM were further characterized to quantify fiber diameter and distribution thereof. Measured fiber diameters ranged from 129 nm to 862 nm, with an average fiber diameter of 340 nm and a median fiber diameter value of 303 nm. A histogram of the measurements (n=158 total, from five SEM images) is shown in FIG. 9.

Single Nanofiber Mechanical Properties

Testing of single nanofibers is extremely tedious and challenging, with limited testing options available. The nanomanipulator approach chosen here enabled testing within the force range appropriate for polymeric nanofibers, imaging of the fiber deformation and failure during testing, and selection of targeted individual fibers. For this work, tensile tests on single nanofibers were performed on fibers prepared from solution containing 20 wt. % polymer and 3 wt. % LiCl. A total of 23 single nanofiber tests were performed on aramid nanofibers. Three exemplar tensile stress-strain curves, in the middle of the range of measured properties, are shown in FIG. 10A. In FIGS. 10B and 10C, SEM images are shown from the beginning and end of the tensile test corresponding to that plotted with blue 'x' symbols in FIG. 10A. The probe tip can be seen progressively moving to the right side, resulting in elongation of the fiber across the center of the image.

The diameters of the fibers that were tested ranged from 120 nm to 590 nm, which covered the range from some of the very smallest fiber diameters produced through the 90th percentile of fibers (556 nm). However, locating and extracting the smallest fibers proved extremely challenging, so tests of the smallest diameter fibers were somewhat limited. To the extent possible with the data collected, effects of fiber diameter, drum speed and annealing on single nanofiber tensile properties were investigated, but none were found to affect tensile properties with any statistical significance. As a result, all data were averaged and a summary is reported in Table 3. Although a range of properties was measured, nanofibers with UTS as high as 1071 MPa, strain to failure as high as 8%, and modulus as high as 70 GPa were characterized. The measured nanofiber properties are impressive for polymeric nanofibers. For example, PAN nanofibers of approximately 200 nm diameter were found to exhibit tensile yield strength of approximately 200 MPa and modulus of 7 GPa. Polyimide nanofibers of approximately 300 nm diameter have been reported to have tensile strength of 766 MPa and modulus of 13 GPa and Nylon 6 nanofibers of approximately 100 nm diameter exhibited modulus of 30 GPa.

TABLE 3

| Property | Ultimate Tensile Stress (MPa) | Strain to failure (%) | Modulus (GPa) |
| --- | --- | --- | --- |
| Average ± Standard Deviation | 584 ± 247 | 4.5 ± 2.9 | 18.2 ± 14.8 |
| Maximum | 1071 | 15.7 | 70.4 |

Tailoring Nanofiber Mat Properties

After quantifying single nanofiber mechanical properties, mat properties and effects of processing parameters were explored for eventual incorporation into composites. To this end, effects of varying areal density and of annealing nanofiber mats were evaluated, comparing against mat properties of the mat spun at 1000 RPM for 5 minutes as the baseline. The spin time was chosen to facilitate easy handling during testing. This baseline mat had an areal density of 3.8 g/m² (or gsm) and was not annealed or post-processed in any way. To investigate effects of areal density, mats spun for a shorter time (3 minutes) and a longer time (7 minutes) were characterized. As can be seen from the exemplar stress-strain curves shown in FIG. 11A, results indicated a decrease in strength and stiffness of the mats as areal density increased from 2.6 to 3.8 gsm. The 3.8 gsm and 5.0 gsm mats behaved similarly under tension. It appears that as areal density is increased, the additional ability to distribute stress through fibers is not proportional to mass increase. Mats prepared under the same conditions as the baseline were annealed at 150° C., both with and without applied tension. Exemplar stress-strain curves comparing the baseline mat to those annealed or annealed under tension can be seen in FIG. 11B. Tensile testing of these mats revealed that annealing alone had no measurable effect on mat tensile properties, whereas annealing under applied tension led to increases in both modulus and strength of the mats. The applied tension causes the fibers to reorient along the direction of applied strain, thus increasing the number of fibers available for distribution of stresses. A summary of the results from the areal density and post-processing experiments is summarized in Table 4. The variation in tensile properties of these nanofiber mats was achieved via simple tailoring of processing parameters or post-processing. This simple pilot study on mat processing parameters illustrates the potential of tailoring nanofiber mat properties as desired for a given application, such as incorporation of these nanofiber mats into composites.

TABLE 4

| Variable | Sample | Strain at Peak (%) | Ultimate Tensile Strength (MPa) | Young's Modulus (MPa) |
| --- | --- | --- | --- | --- |
| Baseline | Baseline: 1000 RPM, 3.8 g/m² | 2.5 ± 0.6 | 3.35 ± 0.61 | 183.9 ± 40.6 |
| Areal Density Effects | 2.6 g/m² | 3.0 ± 1.0 | 5.21 ± 0.89 | 340.0 ± 112.7 |
| | 5.0 g/m² | 2.4 ± 0.7 | 3.56 ± 0.92 | 167.6 ± 36.7 |
| Post-processing Effects | 150° C. Anneal | 2.6 ± 0.9 | 3.93 ± 0.68 | 198.0 ± 9.4 |
| | 150° C. Anneal under Tension | 1.7 ± 0.4 | 4.98 ± 0.79 | 400.1 ± 123 |

CONCLUSIONS

The foregoing working examples illustrate a practical, scalable method for the production of nanoscale aramid fibers from synthesized Cl-PPTA. Controlling the timing and temperature of the polymerization reaction was important to ensure slow reaction kinetics, leading to Cl-PPTA that exhibited increased anisotropy when dissolved. Polymer dissolution was optimized to yield an anisotropic solution by utilizing 15-25 wt. % polymer concentration and 3-5 wt. % LiCl for this particular system. However, solutions that consistently led to continuous fibers during electrospinning were composed of a narrower concentration range: 18-22 wt. % polymer and 3 wt. % LiCl for this particular system. Importantly, the high viscosity, anisotropic solution was able to be electrospun into nanofibers, when the relative humidity was controlled between 40% and 60% RH for this particular system, which provided the ideal conditions for promoting inter-chain hydrogen bonding. Mechanical properties of individual aramid nanofibers were quantified, with measured moduli up to 70 GPa and strengths exceeding 1 GPa. Tensile properties of electrospun mats were used to down-select electrospinning parameters and also provided insight into how the mat properties can be tuned.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nanofiber, comprising: a polyamide including at least one substituted phenyl group; wherein the nanofiber has an average diameter from 50 to 1000 nm; and wherein the polyamide comprises a reaction of at least a Monomer A and a Monomer B that defines a first repeating unit, wherein the polyamide comprises a plurality of first repeating units, and wherein the first repeating unit comprises a structure according to Formula (1):

Formula (1)

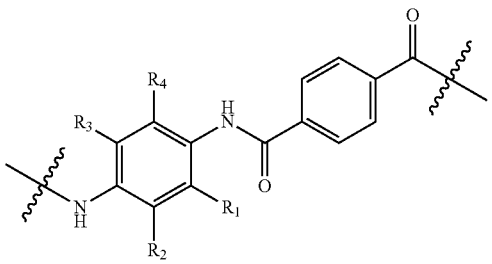

wherein $R_1$, $R_2$, $R_3$, and $R_4$ are each independently selected from H, a halogen, a saturated aliphatic radical having from 1 to 30 carbon atoms, an unsaturated aliphatic radical having from 1 to 30 carbon atoms, a nitro group, a carboxylic acid radical, or an ether radical; and wherein $R_1$ and $R_2$ are each a chlorine atom, or $R_3$ and $R_4$ are each a chlorine atom.

2. The nanofiber of claim 1, wherein the polyamide consists of the plurality of first repeating units.

3. The nanofiber of claim 1, wherein the polyamide further comprises a monomer component comprising 1,4-phenylene-diamine, wherein the polyamide comprises a ratio between the 1,4-phenylene-diamine and the halogen-substituted phenyl group of Formula (1) from 1.2:1 to 9:1.

4. A nanofiber, comprising: a polyamide including at least one substituted phenyl group; wherein the nanofiber has an average diameter from 50 to 1000 nm; wherein the polyamide comprises a reaction product of (i) Monomer A, (ii) Monomer B, and (iii) Monomer C;

wherein Monomer A is selected from one or more compounds according to Formula (2), Monomer B is selected from one or more compounds according to Formula (3), and Monomer C is selected from one or more compounds according to Formula (4):

Formula (2)

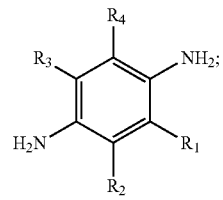

L

Formula (3)

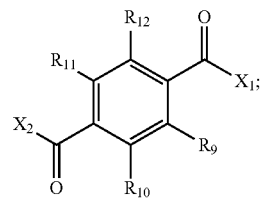

M

Formula (4)

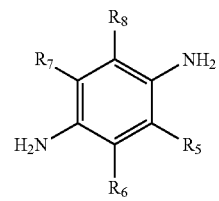

N wherein $R_1$, $R_2$, $R_3$, $R_4$, $R_5$, $R_6$, $R_7$, $R_8$, $R_9$, $R_{10}$, $R_{11}$, and $R_{12}$ are each independently selected from H, a halogen, a saturated aliphatic radical having from 1 to 30 carbon atoms, an unsaturated aliphatic radical having from 1 to 30 carbon atoms, a nitro group, a carboxylic acid radical, or an ether radical, wherein at least one of $R_9$, $R_{10}$, $R_{11}$, and $R_{12}$ is a halogen, wherein $R_1$ and $R_2$ are each a chlorine atom or $R_3$ and $R_4$ are each a chlorine atom, and wherein Monomer A and Monomer B are different;

wherein $X_1$ and $X_2$ are each independently selected from a halogen;

wherein coefficient L is a relative number of moles for Monomer A with respect to a total number of moles for Monomers A through C, coefficient M is a relative number of moles of Monomer B with respect to the total number of moles for Monomers A through C, and coefficient N is a relative number of moles of Monomer C with respect to the total number of moles for Monomers A through C; and wherein L+N=M, and L+M+N=1.

5. The nanofiber of claim 4, wherein N is not zero, and N is greater than L.

6. The nanofiber of claim 4, wherein the polyamide consists of a reaction product of (i) Monomer A, (ii) Monomer B, and (iii) Monomer C.

7. The nanofiber of claim 1, wherein an intrinsic viscosity of the polyamide comprises at least 200 mPa*s.

8. A fibrous mat, comprising: a plurality of nanofibers comprising a polyamide including at least one halogen-substituted phenyl group according to claim 1; wherein the plurality of nanofibers has an average diameter from 50 to 1000 nm.

9. The fibrous mat of claim 8, wherein the fibrous mat has an areal density from 1 gram-per-square-meter (gsm) to 50 gsm.

10. A composite, comprising:
(i) a plurality of nanofibers according to claim 1; and
(ii) a continuous matrix resin; wherein the plurality of nanofibers is at least partially embedded within the continuous matrix resin.

11. The composite of claim 10, further comprising at least one interlayer comprising a fabric of thermoplastic fibers that are different than the plurality of nanofibers, wherein the plurality of nanofibers comprises at least one reinforcing layer; and wherein the at least one interlayer and the at least one reinforcing layer are at least partially embedded within the continuous matrix resin.

12. The composite of claim 10, further comprising a plurality of interlayers, each interlayer comprising a fabric of thermoplastic fibers that are different than the plurality of nanofibers; wherein the plurality of nanofibers comprises a plurality of reinforcing layers and the interlayers are disposed alternately between the reinforcing layers and the plurality of interlayers and the plurality of reinforcing layers at least partially embedded within the continuous matrix resin.

13. The nanofiber of claim 4, wherein N and L are each not zero, a ratio between N and L is from 1.2:1 to 9:1 or a ratio between L and N is from 4:1 to 1.2:1.

* * * * *